US 6,564,587 B2

(12) United States Patent
Artiouchenko

(10) Patent No.: US 6,564,587 B2
(45) Date of Patent: May 20, 2003

(54) METHOD OF PRODUCING AN OPTICAL FIBER BY GATHERING MATERIAL FROM A MOLTEN BATH

(76) Inventor: Viatcheslav Artiouchenko, Hirzerweg 139, D-12107 Berlin (DE)

(*) Notice: Subject to any disclaimer, the term of this patent is extended or adjusted under 35 U.S.C. 154(b) by 40 days.

(21) Appl. No.: 09/944,825

(22) Filed: Aug. 31, 2001

(65) Prior Publication Data
US 2002/0028053 A1 Mar. 7, 2002

(30) Foreign Application Priority Data

Sep. 1, 2000 (EP) .............................. 00250290
Dec. 21, 2000 (EP) .............................. 00250447

(51) Int. Cl.$^7$ ......................................... C03B 37/027
(52) U.S. Cl. .............................. 65/388; 65/404; 65/389; 264/2.1; 264/1.24
(58) Field of Search ......................... 65/388, 404, 389; 264/1.24, 2.1

(56) References Cited

U.S. PATENT DOCUMENTS

| 3,147,073 A |   | 9/1964  | Brown       |         |
|-------------|---|---------|-------------|---------|
| 3,236,608 A |   | 2/1966  | Cavadini et al. |     |
| 3,816,601 A |   | 6/1974  | Junod       |         |
| 3,829,539 A |   | 8/1974  | Blake et al. |        |
| 3,899,313 A |   | 8/1975  | Grabmaier et al. |    |
| 3,932,292 A |   | 1/1976  | Junod       |         |
| 4,030,965 A | * | 6/1977  | Hammond et al. | 423/497 |
| 4,050,905 A | * | 9/1977  | Swinehart   | 23/301  |
| 4,063,914 A |   | 12/1977 | Roeder et al. |       |
| 4,378,987 A |   | 4/1983  | Miller et al. |       |
| 4,654,110 A | * | 3/1987  | Morrison    | 117/17  |
| 4,842,627 A |   | 6/1989  | Schneider et al. |    |
| 4,978,376 A | * | 12/1990 | Takahashi et al. | 65/388 |
| 5,364,432 A |   | 11/1994 | Leber       |         |
| 5,560,759 A | * | 10/1996 | Kortan et al. | 65/388 |
| 5,566,196 A |   | 10/1996 | Scifres     |         |
| 5,858,052 A | * | 1/1999  | Kopylov et al. | 65/388 |
| 5,897,679 A | * | 4/1999  | Anderson et al. | 65/382 |
| 5,916,364 A | * | 6/1999  | Izumi       | 117/13  |

FOREIGN PATENT DOCUMENTS

| EP | 0247322 | 12/1987 |
| EP | 0352751 | 1/1990  |

(List continued on next page.)

OTHER PUBLICATIONS

M.M. Broer/A.J. Bruce, "Fabrication of heavy metal fluoride glass rods by repetitive high–speed writing," SPIE.
Chemical Abstracts; vol. 133 No. 5 Characteristics of polycrystalline silver halide fiber for transmitting CO2 laser beams.

Primary Examiner—John Hoffmann

(57) ABSTRACT

A starting material for producing optical fibers contains metal halides. The refractive index of the optical fiber formed from the starting marterial is predeterminable by adjusting a composite of the molten bath. The starting material is produced by mixing halogenated gases into a gas mixture with the desired partial pressure ratio, causing a chemical reaction at a first temperature of the gas mixture with at least metal to form a reaction product, the first temperature being higher than the melting temperature of the reaction product and cooling the reaction product to a second temperature that is below the melting temperature.

9 Claims, 11 Drawing Sheets

FOREIGN PATENT DOCUMENTS

| | | |
|---|---|---|
| EP | 0450645 | 10/1991 |
| EP | 0564707 | 10/1993 |
| FR | 1319840 | 3/1963 |
| GB | 930751 | 7/1963 |
| GB | 1140398 | 1/1969 |
| GB | 2009137 | 6/1979 |
| JP | 56167115 | 12/1981 |
| JP | 62-223034 | * 10/1987 |
| JP | 63190741 | 8/1988 |
| JP | 03214105 | 9/1991 |
| JP | 03232734 | 10/1991 |
| JP | 63311206 | 12/1998 |
| JP | 59-84202 | * 2/2000 |
| LU | 67990 | 9/1973 |
| WO | WO 99/54766 | 10/1999 |
| WO | WO 99/56161 | 11/1999 |
| WO | WO 00/46622 | 8/2000 |

* cited by examiner

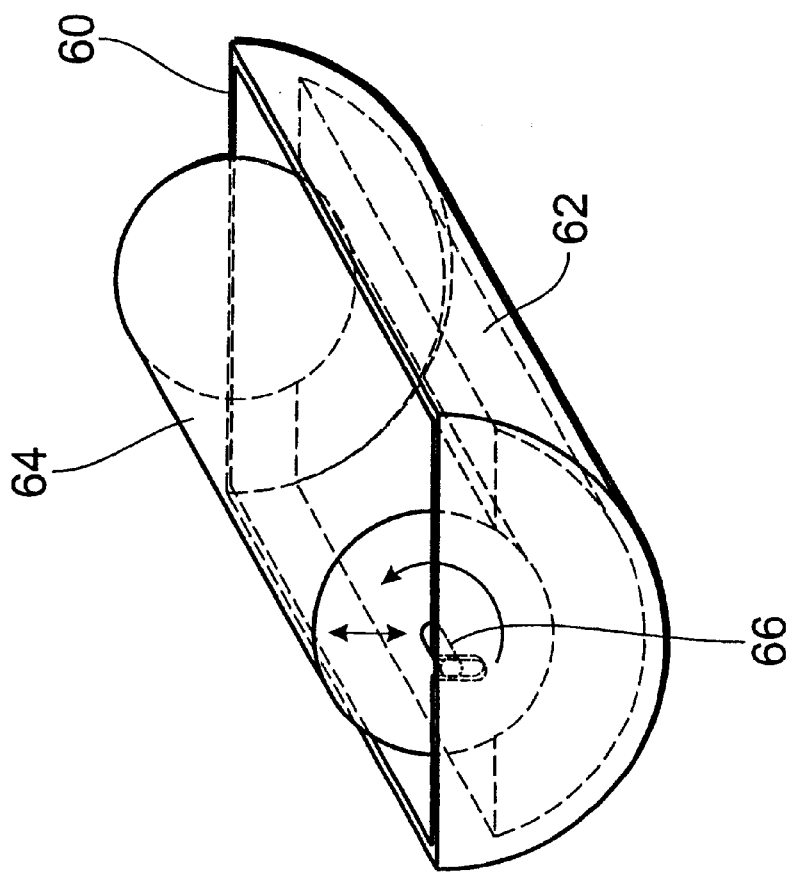
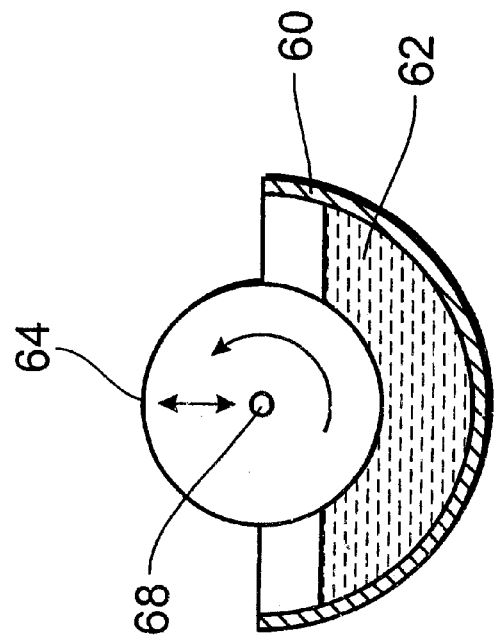
Fig. 2a
Fig. 2b

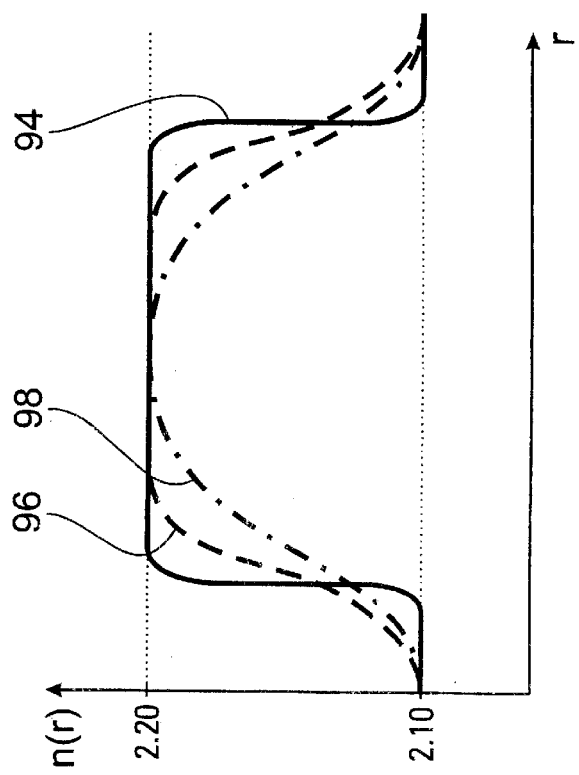
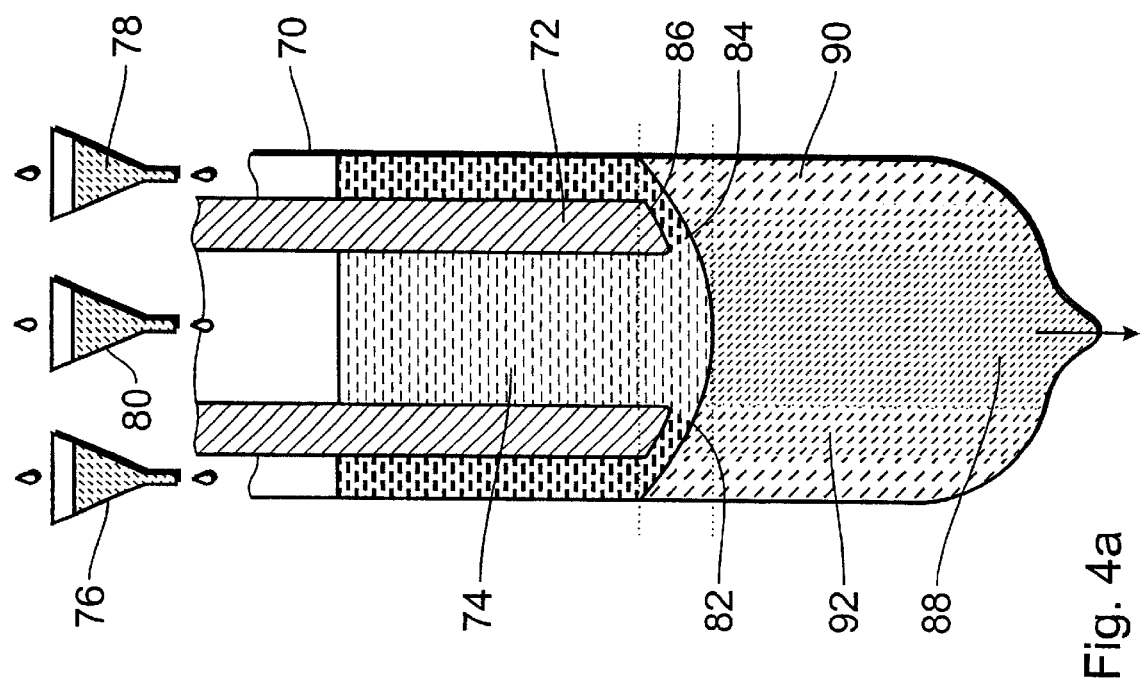
Fig. 4b
Fig. 4a

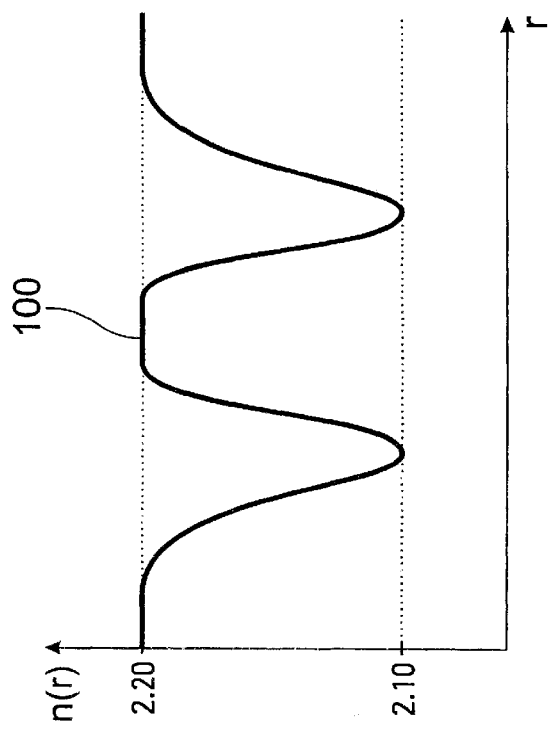
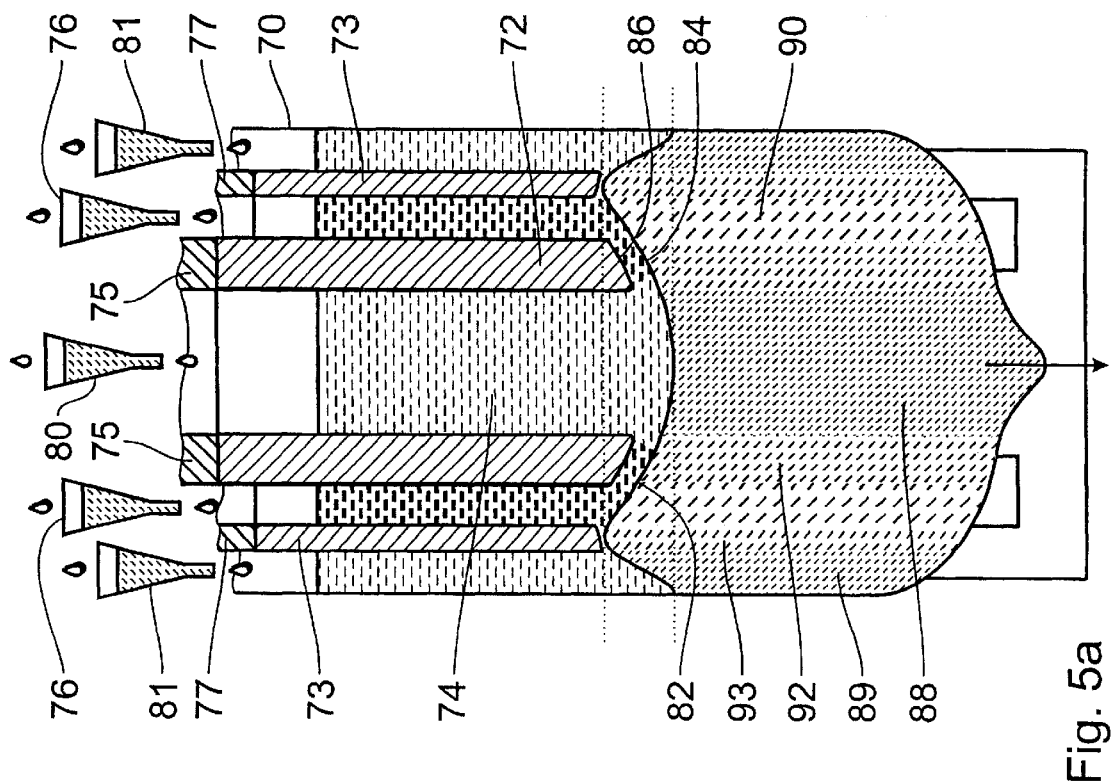
Fig. 5b
Fig. 5a

METHOD OF PRODUCING AN OPTICAL FIBER BY GATHERING MATERIAL FROM A MOLTEN BATH

The present invention relates to an optical fiber and a process for producing the optical fiber, especially an optical fiber having properties surpassing those known in the prior art.

BACKGROUND OF THE ART

Predominantly metal halides are used for radiation conduction with optical fibers in the medium infrared spectral range, which covers the wavelength range between approx. 4 and 18 micrometers. One is dealing in this connection with polycrystalline materials as a rule.

Known fibers have high leakage based on a relatively rough structure and numerous impurities and the fibers' low mechanical load capacity.

Optical fibers normally have an fiber-optic channel or core and a cladding with a refractive index n that deviates from that of the core, in particular, usually being lower than that of the core. A light wave that is coupled into the core of the fiber is ideally fully reflected between the core and the cladding and held in the optical fiber in this manner. The cladding is primarily supposed to prevent the overflow of light, for example, from one core to another in a bundle of fibers.

A special type of optical fibers are so-called single mode fibers, which fulfill special known conditions as such with respect to the size of the core diameter with reference to the ratio of wavelengths to be coupled to the numeric aperture. These types of single-mode fibers have extraordinarily high requirements and are used for example for the heterodyne detection of objects, whereby the radiation emanated from the object of a specific wavelength is coupled into two laterally separated single-mode fibers and the phase or time displacement between the two fibers is evaluated from the signals picked up on their respective ends.

Another special type of optical fibers is represented by the so-called SELFOC fibers, which are self-focusing. Self-focusing means that an image coupled into such a fiber in one location recurs at certain intervals similar to the situation with a sequence of convergent lenses, which are at such intervals from one another that the focal point corresponds at both sides of the convergent lenses with one of the focal points of the next respective convergent lens. A parabola-like index of refraction profile of the optical fibers is required in this connection. As a result, an object of the present invention is to provide a process for producing an optical fiber with which high product quality can be reliably. In addition, it is an objective of the invention to disclose an optical fiber with the best possible fiber-optical characteristics, in particular in the medium infrared spectral range.

SUMMARY OF THE INVENTION

The objective is attained with respect to the process aspect for one by a process to produce a starting material containing metal halides with a specific index of refraction for an optical fiber with the following steps:

Mixing halogenated gases into a gas mixture with a partial pressure ratio that is a function of the index of refraction of the starting material, Causing a chemical reaction of the gas mixture with one metal to at least one reaction product with an initial temperature above the melting temperature of the reaction product and;

Cooling the reaction product to a second temperature below the melting temperature.

In accordance with the invention, halogenated gases are first mixed. Then a direct chemical reaction between the halogen particles and a metal or a metallic mixture is brought about.

The mixing ratio of the halogenated gases is selected in accordance with the index of refraction desired for the starting material containing metal halides that is being produced. Any index of refraction can be set with the process in accordance with the invention due to the adjustable mixing ratio of the halogenated gases within a value interval prescribed by the respective pure metal halides.

Thus, silver halide has an index of refraction of approx. 2 in the spectral range between 4 and 14 micrometers, for example.

In many embodiments, the correct mixing ratio be attained by adjusting the partial pressures of the halogenated gases that are used. The partial pressure ratio can be adjusted, for example, by correspondingly controlling the opening of the gas valves at the outlet of the gas containers each of which contains one of the halogenated gases. Alternatively, an individual gas source in which the halogenated gases are already present in the required mixing ratio can be used in the production process.

The correct partial pressure ratio is set as a function of the desired index of refraction in accordance with the boundary conditions of the chemical reactions being caused. In this case, the halogens involved in the reaction, the metal or metals involved in the reaction, the reaction temperature and the reaction atmosphere (inert gas or vacuum, for example) can influence the setting of the partial pressure ratio.

The process in accordance with the invention overcomes the limitation that exists with known production processes of the mixing ratio of metal halides in the starting material being limited to a very limited value interval.

In the case of one embodiment of the invention, the reaction of the halogen particles with the metal or the metal mixture is brought about in a vacuum. Alternatively, the chemical reaction can take place in an inert gas atmosphere.

In at least one embodiment, the inventive process is designed to produce a solid solution of metal halides.

In these embodiments, alkali metals, in particular potassium, sodium or cesium, rubidium or thallium or silver are used as metals.

Gases containing bromine, iodine or chlorine are used as halogenated gases individually or in combination in different exemplary embodiments. Halogen gases with especially high purity are typically used. Commercially available high-purity halogen gases can be used for this or correspondingly designed purity steps can be added to the production process itself.

The process in accordance with the invention is suitable in particular for producing a solid solution of $AgBr_xCl_{1-x}$ over the entire range of the mixing ratio, i.e., $0 \leq x \leq 1$. This starting material for optical fibers can be produced with the process in accordance with the invention with especially high mechanical ruggedness and optical quality.

The partial pressure ratio is set in another embodiment of the invention in such a way that the solid solution contains bromine and chlorine in a particle number ratio of 3 to 1.

The microstructure of the polycrystalline solid solution is especially homogenous with this ratio. As a result, the light scatter in the fibers is minimized.

In another embodiment of the process in accordance with the invention, the metal is purified electrolytically in an additional step before the chemical reaction with the halogens is brought about.

In order to produce especially pure starting material for optical fibers, the liquid reaction product is guided through a purification stage before the step of cooling to a temperature below the melting point. Plans can be made for several consecutive purification steps. The purification takes place by guiding the liquid reaction product through capillary vessels, for example.

Another purification effect is achieved in an exemplary embodiment by moving the reaction product along a temperature gradient in a furnace during cooling from the first temperature to the second temperature. A temperature gradient can be set for example in a reactor with an oblong furnace by providing heating elements that can be controlled separately along its longitudinal extension. Thus, the reaction product can be cooled bit by bit, wherein the crystallization front is stationary. The crystallization front is the area within the reactor in which the reaction production falls short of the melting temperature and crystallizes.

Another inventive idea independently worthy of protection concerns a process to produce a blank for optical fibers with the following steps:

Preparing a bath with liquid starting material,

Rotating a solid core that is partially submerged in the bath in such a way that a thin layer of the starting material accumulates on the circumferential surface of the core in such a way and crystallizes there so that the solid core grows in the radial direction while rotating.

In the case of the process in accordance with the invention, first a bath is prepared with the starting material. This can be accomplished for example using the process steps from the process described above, i.e.:

Mixing halogenated gases into a gas mixture with a partial pressure ratio that is a function of the index of refraction of the starting material, Causing a chemical reaction of the gas mixture with one metal to at least one reaction product with an initial temperature above the melting temperature of the reaction product.

The liquid reaction product is then collected in a bath and kept there at a temperature above the melting point. For this purpose, heating elements can be built into the walls of a vessel in which the bath is situated, for example.

Basically, other known processes can also be used to produce liquid starting material, however.

Liquid starting material can be refilled continuously or metered out step by step during the subsequent process steps. If a second starting material is refilled, the index of refraction of the crystallizing material changes in accordance with the concentration of the second starting material. An index of refraction gradient can be created in the radial direction in this manner.

Regardless of whether the refilled starting material remains the same during the production process or another starting material is refilled, as well as regardless of whether the refilling takes place continuously or in separate batches, one embodiment has means to homogenize the liquid starting material in the bath. These homogenizing means can be designed, for example, so that they regularly or irregularly set the bath into vibration. Thus, a piezoelectric vibration generator is provided, which connected with a tub for the bath of the liquid starting material. As an alternative or in addition to this, gas lines can be provided along the bath, which having openings distributed uniformly along their length from which gas can exit. The gas bubbles ascending in the bath move the liquid starting material and thereby blend it together in this way.

In the process in accordance with the invention, a solid core is then partially submerged in the bath. The core is composed for example of the same material as the bath. A homogenous blank can be produced in this way.

Using a core that has the bath material only on its circumferential surface and an inside core of second material is also conceivable. A blank with the shape of a hollow cylinder can be produced this way by subsequently removing the inside core.

Finally, the core can also be composed completely of another material than the bath. A blank with a core and cladding can be produced in this way by crystallizing the bath material on the core. Tthe core and cladding should have different optical properties.

For example, a core can be used that is composed of a solid solution of AgBr and AgCl with a first mixing ratio. Due to the crystallization of the liquid starting material, which has another mixing ratio than that of the core, a blank is formed with a cylindrical shape, for example, whose core and cladding have different indices of refraction.

Rotating the core takes place in such a way that a thin layer of the starting material accumulates on the circumferential surface of the core and crystallizes there. The crystallization takes place by cooling the liquid material adhering to the circumferential surface in contact with an inert gas atmosphere or in a vacuum after re-emerging from the bath.

The rotating speed of the core is set in such a manner that an optimum is achieved with respect to the growth speed, on the one hand, and with respect to crystal quality, on the other. The grown material should have a homogeneous microstructure and cause only low leakage.

The growth on the circumferential surface takes place, as seen as a whole, in a radial direction, i.e., perpendicular to the rotational axis. Of course, this does not preclude in particular a crystal bond of adhering particles from also occurring on neighboring, previously crystallized areas in the circumferential direction.

Depending upon the temperature of the bath and reaction atmosphere, the crystallization of adhering liquid material can take place directly after emergence from the bath or at a later point in time before the next re-submersion in the bath.

The process in accordance with the invention is especially suited for producing cylindrical blanks for optical fibers. Other geometric shape can be realized in principle, however. For example, by using infrared irradiation on limited sections of the surface along the rotational axis of the growing blank outside the bath, crystallization can be prevented in these areas. In this way, a non-homogenous crystal growth is created in the radial direction along the rotational axis. Using targeted irradiation, for example by using correspondingly installed projection lenses for the irradiated infrared light, blanks can be realized with any geometric shape, as a rule. The shape will have cylindrical symmetry if the radiation is constant in terms of time, and, if the radiation is varied in terms of time, other shapes can also be realized.

In one embodiment of the invention, the liquid staring material is replaced in the bath while rotating the core by another starting material for another index of refraction. Blanks can be produced in this way with a sequence of different material layers in the radial direction. For example, layers with difference indices of refraction can follow one another in the radial direction. The material layers in this embodiment have relatively sharp boundaries so that the index of refraction changes in a stepped manner in the radial direction.

A continuous variation of the material properties can be attained by continuously exchanging the liquid starting material in the bath while rotating the core. Thus, it is possible to continuously increase the concentration of AgBr in an AgCl bath via an inflow of pure AgBr. A liquid AgBr/AgCl solution with a relatively high concentration of AgBr relative to the bath can also be used instead of pure AgBr.

To produce cylindrical blanks, the process is conducted so that the rotational axis always runs parallel to the surface of the liquid starting material.

It is typical that the distance between the rotational axis and the surface of the liquid starting material increases continuously. This is accomplished while the submersion depth of the growing blank remains constant during growth, so that there are always constant growth parameters.

Another inventive idea independently worthy of protection concerns a process to produce a blank for optical fibers with the following steps:

Guiding at least one liquid starting material through at least two tubes having different diameters, wherein a first tube surrounds at least a second tube, Continuously uniting the starting material near the discharge opening of the second tube in a diffusion zone and Converting the material in the diffusion zone into the solid phase.

This process in accordance with the invention is suited in particular for producing blanks for polycrystalline optical fibers having several sections with different properties in the cross-section profile. This is brought about by different liquid starting materials being guided through different tubes during the production of a blank. The first tube corresponds in terms of its internal dimensions to the external dimensions of the blank being created. It can have a closed end. The second tube runs through the first tube and discharges into the first tube. Once the starting material has exited from the second material into the discharge area, the liquid starting materials of the first and second tubes are united. Then they are converted to the solid phase. In this way, a blank is created whose cross-section has a section with dimensions corresponding approximately to the cross-section of the second tube. This section can be fabricated from a material, which differs at least in terms of the index of refraction from the material fed via the first tube.

The first and second liquid starting materials are directly adjacent to one another near the discharge opening of the second tube into the first. A diffusion zone is formed. This is where a blending of the liquid starting materials takes places, predominantly or exclusively utilizing the diffusion. Control over the blending taking place is all the better, the greater the share of diffusion is in the blending of the starting materials.

The diffusion zone extends within the first tube in the longitudinal direction from the discharge opening of the second tube up to a crystallization front, whose precise position is dependent upon the location where the temperature falls short of the melting temperature. This location can be preset as a process parameter.

The crystallization front is the boundary surface between the liquid and a solid phase. The shape of the boundary surface is a function of the temperature distribution in the cross-sectional planes of the first tube. In addition, the shape of the boundary surface with a mixture of two starting materials is a function of the concentration of the individual starting materials since the different starting materials have different melting temperatures as a rule.

The degree of blending of the starting material fed via the first and second tubes, for one, depends naturally on the materials used. The inter-diffusion of two liquid starting materials is governed by the physical properties of the two liquids.

The blending of the liquid starting materials can be influenced in a targeted manner, however, by process control, on the other hand. For example, the degree of blending of the different materials depends on the duration of blending. Diffusion will be stopped by quickly bringing about crystallization just after the liquid starting material exits from the second tube. Relatively abrupt material boundaries are created along the cross-section in this manner. In the case of a cylindrical fiber blank, stepped indices of refraction can be realized in the radial direction in this way.

On the other hand, if diffusion is permitted over a longer period of time by the materials in the diffusion zone being kept at a temperature above the melting point, a relatively extended diffusion zone is generated. In this way, a fiber blank can be realized with an index of refraction profile in cross-section, which has one or even more sections of a gradual, continuous increase or decrease of the index of refraction. The gradient, i.e., the degree of the increase or decrease of the index of refraction can be predetermined precisely with the process in accordance with the invention. The expansion of the diffusion zone in the cross-section plane shall be specified for this along with the index of refraction of the starting material.

In order to realize a diffusion zone with a specific expansion in a cross-section profile, the wall thickness of the second tube can be suitable as a control parameter along with the diffusion duration. A cylindrical blank is considered as an example. The expansion of the diffusion zone in the radial direction can be influenced not just by the diffusion duration but also by the targeted selection of the thickness of the wall of the second tube. A thicker wall increases the surface of the area in the cross-section profile of the fiber blank being generated by the blending of the starting materials discharging from both tubes. However, it must be taken into account in this connection that with unfavorable conditions a non-homogenous blending can occur as a result of uncontrolled flow conditions in the discharge area of the tubes.

The position of the diffusion zone in the cross-section profile of a fiber blank can be predetermined by a corresponding arrangement of the two tubes within the first tube.

Depending upon the desired cross-section profile of the fiber blank, for example with respect to its index of refraction, several tubes can also be arranged within the first tube. Therefore, a second and third tube can be used along with the external first tube for a W-shaped index of refraction profile of a cylindrical fiber blank. The third tube runs in through the second tube and the second one runs through the first tube. The tubes run concentrically. A first liquid starting material is guided through the first and third tube and a second liquid starting material is guided through the second tube. In the solid phase, the second starting material has a lower index of refraction than the first starting material.

The tubes do not have to be arranged concentrically, however. The arrangement of the second, third, fourth, etc. tubes within the first tube is determined in accordance with the desired cross-section profile. Fibers with three cores running next to one another, for example, can also be produced in this way.

Of interest in this connection is an arrangement of different tubes in a rectangular cross-sectional matrix in which the blank for an optical fiber can be generated with several light channels separated from one another whose arrangement corresponds to the arrangement of sensors on a correspondingly detector so that the coupling between the detector and optical fiber is especially simple.

In addition to the index of refraction of the fiber blanks, other physical parameter profiles can also be influenced in a targeted manner with the process in accordance with the invention, such as the transmission profile, for example.

Of course, the process in accordance with the invention can also be used, however, for producing a blank that is homogenous in terms of the cross-section by the same material being guided through all tubes. It is also understood that blanks with the most varied external dimensions and shapes can be produced with the process. In addition to a cylindrical shape, blanks can also be produced in a cuboid shape. Only correspondingly shaped tubes must be used. The first and second tubes can also have different cross-section shapes. For example, the first tube can have the shape of hollow cube and the second tube can be a hollow cylindrical shape (at least in the area of its discharge opening).

In connection with the already addressed optical fibers with a multiplicity of light channels, the types of light channel cross-sections that correspond in terms of shape with the shape of the sensors, i.e. that are square, are typical for optimal coupling of a light channel to a corresponding detector with a multiplicity of sensors that are arranged matrix-like. Even the outer cladding of the fibers can then be square so that several fibers can be combined into a bundle whereby the arrangement of all light channels in the bundle corresponds to the arrangement of the sensors on the detector.

The process in accordance with the invention is suited particularly for producing fiber blanks made of metal halides. It is typical that it be used to produce fiber blanks containing the material system AgBr/AgCl in a solid solution. In this connection, areas with different mixture ratios can be adjacent to one another. The mixing ratio can change abruptly or gradually transverse to the longitudinal axis of the fiber blank. Consequently, it is also possible to produce optical fibers with index profiles in the infrared spectral range between 4 and 18 micrometers with the process in accordance with the invention. A fiber blank made of AgBr/AgCl produced with the process in accordance with the invention has an especially homogenous microstructure.

In the case of an embodiment of the process in accordance with the invention, until being united in the diffusion zone, the starting materials pass through a temperature profile in the longitudinal direction of the tubes in such a way that the temperature of the starting materials diminishes downstream and reaches approximately the melting temperature in the area of the discharge opening. The gradual cooling of the starting materials promotes the homogeneity of the microstructure of the fiber blank being created.

In at least one embodiment of the inventive process, the first tube is moved relative to the second tube in the direction of the diminishing temperatures in order to convert liquid starting material to the solid phase.

The movement of the first tube relative to the second tube should take place so that liquid starting material is always converted at about the same distance from the discharge opening of the second tube into the first tube. This can be accomplished for example by the first tube being moved in the longitudinal direction in a furnace with a prescribed temperature profile. The temperature profile is established so that the melting temperature is fallen short of at a prescribed distance from the discharge opening of the second tube into the first tube and continues to drop with increasing distance. Liquid starting material fed from the first and second tubes can flow into the diffusion zone due to the movement of the first tube relative to the second and subsequently changes to the solid phase when it has reached the prescribed distance from the discharge opening of the second tube. The transport of crystallized material away from the crystallization front is guaranteed in this way so that continuous growth of the blank is guaranteed. Due to this process control, the length of the blank being produced is not limited as a rule.

It is understood that instead of the movement of the first tube, the temperature profile and the second tube can also be shifted at the same time in the longitudinal direction. As a result, the same relative movement between the first tube and the second tube as well as the temperature profile is realized. This alternative will no longer be mentioned separately in the following for the sake of clarity of the description.

The speed of the relative movement from the first and second tube has a substantial influence on the duration of diffusion at the boundary surface between the first and second starting materials. The cross-section profile of the optical properties of the blank being produced can be influenced by controlling the speed. If the liquid material is moved into the diffusion zone at a relatively high speed in the direction of the crystallization front, the diffusion time span is short and the transition area between the first and second starting materials is of low expansion. This generates a cross-section profile of the index of refraction with a stepped progression. On the other hand, if the speed is low, the expansion of the transition area is larger and the index of refraction profile has roughly linear and/or curved sections.

Another possibility for influencing the forming cross-section profile of the fiber blank is offered at this point: the progression of the index of refraction profile in the transition areas between the different starting materials can also be influenced by the shape of the front surface of the tube walls at the discharge opening. Essential in this case are the position and shape of the front surface of the second tube with respect to the position and shape of the crystallization surface. Because with constant speed of the movement of the first tube, the distance between the front surface of the tube and the crystallization surface determines the duration of diffusion. If this distance varies in the radial direction over the extension of the wall, then the blending of the starting materials that are adjacent here is dependent upon the radial position. Basically curved or linear index progressions can be realized, as a result, by the corresponding shape of the front surface of the second tube in the transition area between the different materials.

It is typical that a process be conducted with tubes whose front surface runs parallel to the crystallization surface. In this way, the diffusion duration is made independent of the radius. A linear index progression results in the transition area.

Blanks where the cross-section profile of an optical parameter change in the longitudinal direction of the blank can be produced with the process in accordance with the invention. In one embodiment, the index of refraction profile is formed differently in the cross-section of a cylindrical blank in the longitudinal direction of the blank. This occurs, for example, by changing the speed of travel of the first tube. As explained above, this changes the expansion of the transition area between adjacent materials. If the speed is increased approximately in the course of producing a blank, the expansion of the transition area in the cross-section decreases. In this way, a blank can be fabricated which has an index of refraction that can be changed linearly in a longitudinal section and an index of refraction that can be changed in a stepped manner in another longitudinal section.

Another inventive idea independently worthy of protection concerns a device to produce a fiber blank that includes at least two tubes, of which a first tube surrounds at least a second tube at least in the area of one front surface of the second tube, and a heating device, which is designed to generate a temperature profile in the tubes, which profile can be modified in the longitudinal direction of the first tube, whereby the cited front surface has a surface section whose surface perpendicular forms an acute angle with the longitudinal axis of the second tube.

The device in accordance with the invention is designed to execute the process described above. In the case of this device, at its longitudinal end where liquid starting material discharges into the first tube, the second tube has a front surface with a surface section whose surface perpendicular forms an acute angle with the longitudinal axis of the second tube.

To explain the invention it is assumed to begin with that, when producing fiber blanks, the phase boundary surface between the liquid starting material and the solid blank is kept stationary by setting the temperature profile correspondingly. This is easy to accomplish. For example, the first tube can be moved in a stationary temperature profile generated by the heating device. In this way, the fiber blank is allow to grow in the longitudinal direction by material being fed bit by bit through a zone of decreasing temperature. It always crystallizes the liquid starting material, which just passes the phase boundary surface i.e., the location of the longitudinal expansion of the first tube at which the melting temperature is fallen short of. In the further course of things, this material continues to cool.

With the formation of the front surface in accordance with the invention a situation is achieved where, when operating the device, the diffusion zone described above has a longitudinal expansion for a fiber blank in the boundary area of different liquid starting materials that varies in the directions transverse to the longitudinal axis of the second tube. The longitudinal expansion of the diffusion zone is the distance between the front surface of the second tube and the phase boundary surface. As a result, the time span during which diffusion is permitted between the adjacent starting materials is dependent upon the position transverse to the longitudinal axis. This means, as described with the example of a cylindrical fiber blank, the diffusion time span is dependent upon the radial distance from the longitudinal axis to the second tube. The blending of the neighboring starting materials varies automatically with the diffusion time span, however. And the optical properties, for example, vary in turn with blending. In this connection, reference is made to the solid solution of AgBr/AgCl already mentioned above.

Consequently, a fiber tube can be produced with the device in accordance with the invention, which has gradual, linear or non-linear transitions of the index of refraction profile. The type of respective transition can be influenced by the design of the front surface.

A stationary phase boundary was assumed with the previous representation. In the case of the device in accordance with the invention, the diffusion duration is itself then a function of the radial distance, however, if the phase boundary surface between liquid and crystal in the longitudinal direction of the first tube is moveable and not stationary. However, in this case control over the change of the mixing ratio in the diffusion zone is more expensive to realize since the movement of the phase boundary must also be taken into consideration.

The most varied designs of the front surface of the second tube are advantageous. Because, as a rule, the special formation of the front surface depends upon the desired cross-section profile of the index of refraction. Common to all formations is that there is a front surface section whose surface perpendicular forms an acute angle with the longitudinal axis of the second tube. This surface section can be flat or curved.

In one embodiment of the device of the invention, the front surface of the two tubes runs parallel to a phase boundary surface between a liquid and a solid phase of the starting material that forms during device operation at a distance before the tube discharge opening. In the case of this embodiment, the diffusion time span is consequently constant in the radial direction. Therefore, a particularly exactly predictable index of refraction profile can be formed which runs steeper or flatter depending upon the diffusion duration.

In this connection, the front surface in one embodiment is designed to be curved. A curved phase boundary surface occurs, for example, with the creation of a solid solution of AgCl/AbBr with a chlorine concentration from the molten mass that varies in the radial direction. The melting temperature of this solution is approximately linearly dependent upon the concentration of the chlorine in the solution. As a result, areas of low chlorine concentration have a lower melting point than areas of higher chlorine concentration. As a result of diffusion, an area with a variable melting temperature in the radiation direction is created in the diffusion zone between areas with different chlorine concentrations. The varying melting temperature allows a phase boundary surface to be created between liquid and solid silver halides, which follows the prevailing temperature profile in the radial direction of the chlorine concentration, for one, and, on the other hand, in the longitudinal direction of the first tube.

In another embodiment, the front surface is curved convexly. A convex curvature correspond to the shape of the phase boundary surface forming in the first tube, if the material in the core of the fiber blank being produced has a lower melting temperature than in the area of the cladding. Consequently, a concave curvature of the front surface is used with opposite conditions.

The first tube is mounted so that it is displaceable longitudinally in one embodiment. The advantages of this embodiment were explained in detail above on the basis of the description of the process.

A further aspect of the invention that is independently worthy of protection is a process to produce an optical fiber from a blank made of raw material, in which the blank raw material is extruded through a nozzle. The nozzle is set in vibration in the case of the process in accordance with the invention.

In the extrusion of raw material, raw material particles in the size of several micrometers are pressed through a nozzle and thereby connected. A micro-crystallite structure is generated in this process. The process in accordance with the invention solves the problem that, when pressing the crystallite of the blank through the nozzle, larger gas-filled interstices can form between neighboring micro-crystallites in the fibers being generated. This problem is avoided with the process in accordance with the invention by the nozzle being set in vibration. A periodic pressure increase and decrease is superimposed on the extrusion pressure exerted on the material by the nozzle. As a result, the crystallites that are in contact with the nozzle are set in vibration. These interact with other crystallites due to the vibration. This vibration shakes the crystallites in such a way that the gas interstices between them are minimized. The crystallites are pressed more compactly than with known processes. As a result, the leakage of gas filled interstices at the boundary surface and the micro-crystallites are strongly reduced.

The nozzle is set in ultrasonic vibration in at least one embodiment of the invention.

The vibration is transmitted to the nozzle via a ram in a further embodiment of the invention.

An extrusion device that is independently worthy of protection, which is designed to execute the process in accordance with the invention, is comprised of a ram that can be displaced longitudinally and a nozzle. In accordance with the invention, the nozzle is coupled with means to generate vibrations. The means to generate vibrations can contain a piezoelectric crystal.

In the case of this embodiment, the blank is located in a chamber into which the ram is pressed. Alternatively, it is also possible to keep the ram stationary with the nozzle and move towards the nozzle and the ram with the blank in the chamber. Particularly in this case the chamber can also be set in vibration. A piezoelectric vibration mechanism, which acts either on the chamber or, as already described, on the ram is used for this, for example.

A further aspect of the invention that is independently worthy of protection concerns an extrusion device, whose nozzle has an exit section whose shape deviates from the external cross-section of the blank so that fibers with a square or other cross-section can be extruded starting with round blanks, for example.

A further aspect of the invention that is independently worthy of protection concerns an optical fiber with a fiber end where a reflection-reducing microstructure is provided on the end of the fiber.

The optical fiber in accordance with invention has the advantage that a reflection-reducing microstructure directly on the end of the fiber at the same time forms protection for the inside of the fiber. As a result, the fiber is less sensitive to environmental influences.

The microstructure is impressed on the fiber material with one embodiment of the invention.

Alternatively, an element affixed to the end of the fiber that has the microstructure can be provided. The element is usually resistant to chemical substances that are present in its environment. The element is fabricated of artificial diamond in one embodiment.

As a supplement to the microstructure for example, the element can contain a radiation filter that is permeable for certain wavelengths or be used alone as a radiation filter.

In another embodiment an optical fiber is provided with a microstructure that is designed in such a way that at least a portion of the radiation emerging from the end of the fiber is scattered.

Another inventive idea independently worthy of protection concerns an optical fiber, which comprises several light channels. These light channels are primarily formed by cylindrical cores with a first index of refraction inside the fiber, which are enclosed by a cladding with a second index of refraction and are separated from one another by the cladding. Electromagnetic radiation with suitable wavelengths is fully reflected in the boundary area between the cladding and the respective core. The advantage of this type of fiber for one is that, due to the great number of light channels, a greater quantity of information can be transmitted through the fiber than is the case with conventional optical fiber with a single light channel. In addition, it is possible to use these fibers to conduct spectral analyses on examination objects. To do this, wideband electromagnetic radiation is guided through a first core to the examination object. A simple light-emitting diode can be used as a source of radiation. The light reflected on the examination object is then guided back through a second core of the fiber. Conclusions about the condition of the examination object can then be drawn from the spectrum of reflected light. As a result, spectral analyses can be conducted on poorly accessible examination objects.

An advantageous development of the fiber with several cores is attaching spectral filters on at least one of the ends of the fiber. These spectral filters are usually attached on at least one end of the cores. The spectral filter has the property of only being permeable for radiation with specific wavelengths. Consequently, the radiation exiting from the end of the light channel with the spectral filter only has wavelengths that match the spectral filter.

Various devices can be used to decouple and transmit the electromagnetic radiation from the cores to detectors. For one, it is possible to project the end of the fiber by means of lenses on a plane. The image of the end of the fiber on the plane should represent an enlargement. A detector can pick up the radiation exiting from the core by the detector being placed in the area of the projection plane where the end of the light channel is reproduced. Thus, the radiation exiting from one of the cores can always be fed separately to the detector. Since the image of the end of fiber in enlarged on the projection plane, the distances between the light channels on the projection plane are also greater so that it is simpler to detect the radiation exiting from the light channels separate from one another.

With respect to coupling a fiber to a detector, in particular an optical fiber with several light channels that are separated from one another, it is especially simple to create a fiber whose arrangement corresponds to the arrangement of the sensors on the corresponding detector, so as to couple the detector with the optical fiber. One such arrangement of a plurality of light channels in an optical fiber is a matrix with a rectangular cross-section.

In the case of optical fibers with a plurality of light channels, such light channel cross-sections, whose shape corresponds to the shape of the sensors, i.e., are square, are used for optimal coupling of a light channel to a corresponding detector with a multiplicity of sensors that are arranged in a matrix-like manner. Then the external cladding of the fiber can also be square so that several fibers can be combined into a bundle, whereby the arrangement of all light channels in a bundle corresponds to the arrangement of the sensor on the detector.

In addition, it is possible to use a bifurcated fiber in order to decouple the radiation exiting from the light channels separately from one another. The bifurcated fiber has three ends. The first end, at which a first and a second light channel end, a second end, at which the first light channels ends, and a third end, at which the second end ends. The two light channels branch at the bifurcation in order to run through the branches of the bifurcation separate from one another.

Producing a bifurcated fiber can be accomplished, for example, by two fibers being laterally beveled up to the area of a core so that light can exit from the channel. The beveled areas are then attached to one another in such a way that light can penetrate via the ground surfaces from one core of a fiber into the adjacent core of the other fiber.

Another independent inventive idea concerns an optical fiber with a core in which an optically active material is located. The optically active material is characterized in that it can be excited by the light passing through the core, i.e., the optically active material absorbs the light, after which it adopts a higher energy state. This type of fiber is suitable for producing a laser. The optically active material in the fiber is excited by optical pumping, i.e., by coupling in suitable light or electromagnetic radiation in such a way that a population inversion occurs. The number of excited states exceeds on average over time the number of non-excited states. The laser light is generated by stimulated emission of radiation and exits from the end of the light channel. In order to make a resonator available for the laser light, the ends of the optical fiber are commonly mirrored with one of the mirrors being partially permeable for the laser light so that it can exit from the fiber.

BRIEF DESCRIPTION OF THE DRAWINGS

The invention will be understood best when reference is made to the accompnaying drawings, wherein identical part numbers identify identical parts, and wherein:

FIG. 2a is a perspective principle diagram of a device to produce a fiber blank;

FIG. 2b is a sectional view of the device from FIG. 2a;

FIG. 4a is a sectional view of the device of FIG. 3;

FIG. 4b is a diagram that shows different dependencies of the index of refraction from the radial position with three different cylindrical fiber blanks that were produced by the device in accordance with FIG. 4a;

FIG. 5a is a schematic, very simplified sectional view of another device to produce a fiber blank;

FIG. 5b is a diagram that shows the dependence of the index of refraction from the radial position with another cylindrical fiber blank that was produced by the device in accordance with FIG. 5a;

FIG. 7b is a perspective view of the end of the fiber in accordance with FIG. 7a;

DETAILED DESCRIPTION OF THE DRAWINGS

Figure 1:
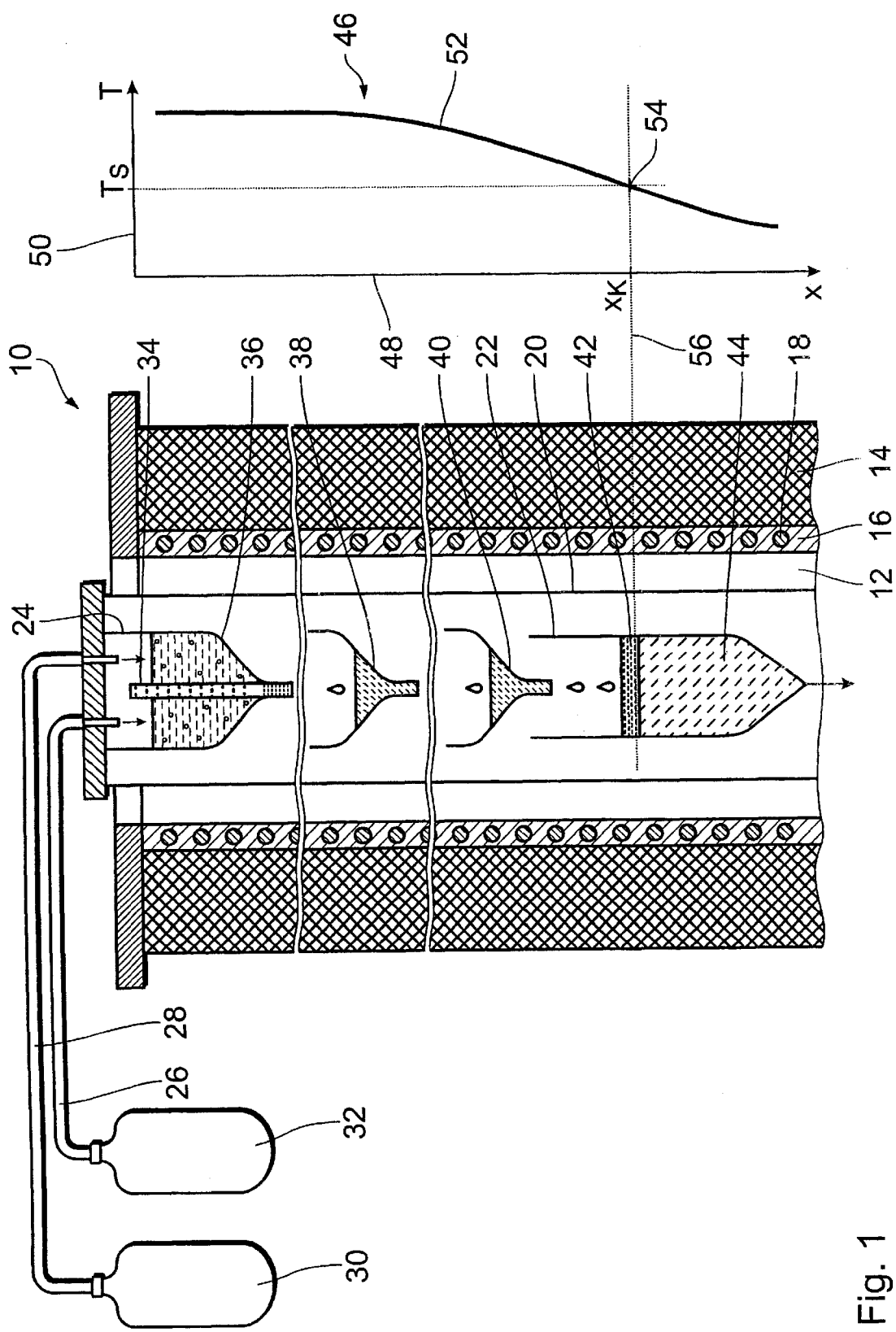
FIG. 1 is a very simplified sectional representation of a reactor to produce and purify liquid starting material as well as to produce a fiber blank.

FIG. 1 shows in a very simplified sectional representation a reactor 10 to produce and purify liquid starting material as well as to produce a fiber blank. The reactor 10 forms a cylindrical reactor chamber 12 whose walls 14 are provided with a heating device 16. Just the heating spirals 18 of the heating device are shown in FIG. 1.

A cylindrical container 20, which surrounds a tube 22, is arranged in the reactor chamber 12. The tube 22 can be connected via connectors that are not shown with external vacuum pumps and with gas containers to produce a vacuum or an inert gas atmosphere. A container 24 is attached within the tube 22. The container 24 is designed to accommodate liquid metal. In addition, the container 24 is connected via gas tubes 26 and 28 with two externally attached halogen gas sources 30 and 32. The liquid starting material for producing the fiber blank is extracted from the liquid metal and the gases originating from the halogen gas sources 30 and 32. The composition of the liquid starting material is determined by the respective partial pressure of the halogen gases above the liquid as well as by the temperature in the container 24. So that the starting material is free of impurities, the container is evacuated before the halogen gases are introduced. As a result, the number of undesired reactive atoms or molecules in the container is very much reduced. In addition, an inert gas, i.e., a reaction-resistant gas such as nitrogen gas or a noble gas is introduced into the container 24. This gas prevents any undesired reactive gases that might be remaining in the container from reacting with the liquid. It is typical that an inert gas be selected that is heavier than the conceivable undesired reactive gases such as oxygen gas or water vapor or their gaseous reaction products so that the undesired reactive gases do not contact the liquid. Not shown are means to set the partial pressure of the two halogen gases in container 24. The halogen gases entering from the sources 30 and 32 are brought to a reaction with the liquid metal in the container 24. For example, liquid silver and the halogen gases bromine and chlorine are brought to a reaction here so that liquid mixture of AgBr and AbCl is created. The container can be heated to a suitable reaction temperature for this purpose.

The container 24 is cylindrical to a large extent, but tapers, however, towards the bottom like a funnel and discharges at the outside wall of a hollow cylindrical tube 34. The tube 34 runs concentrically within the container 24 and extends over the largest portion of its longitudinal extension. The wall of the tube 34 is porous as far as the tube extends within the container so that liquid AgBr and AgCl can penetrate from the container into the tube and flow through the tube towards the bottom and out. The liquid starting material passes through a filter 36 before the exit from the tube 34.

Following the container 24 downward are a number of capillary purification stages, of which two purification stages 38 and 40 are shown here. The purification stages 38 and 40 are funnel-shaped and contain a capillary filter material. The liquid starting material runs through these purification stages and collects after exiting from the last purification stage 40 in a starting material bath 42 in the lower area of tube 22. The starting material bath 42 is positioned on a solid blank section 44, which is generated towards the bottom from the liquid starting material bit by bit by cooling under the melting temperature with constant feed of the tube 22.

The tube 22 along is attached in a displaceable manner together with the container 20 along the reactor chamber.

The storage, drive and control devices provided for this purpose are not shown in FIG. 1 for the sake of simplicity.

The heating device 16 is designed in such a way that temperature profile that can be modified in the longitudinal direction of the reactor chamber 12 can be set. An example of this type of temperature profile is shown in FIG. 1 to the right of the reactor 10 in the form of a temperature diagram 46. In the temperature diagram 46, an abscissa 48 runs from the top to the bottom deviating from the normal representation. Marked on the abscissa 48 are positions x along the longitudinal extension of the reaction chamber 12 depicted to the left of the diagram relative to the upper edge of the reactor chamber. Temperature T in the reactor chamber 12 is marked on the ordinate 50, with the temperature values on ordinate 50 in temperature diagram 46 increasing from the left to the right. The temperature profile shown here is therefore the dependence of the temperature T in the reactor chamber 12 from position x along the longitudinal direction of the reactor chamber.

Temperature value $T_s$ is identified on ordinate 50 and indicates the melting temperature of the liquid starting material. This value is also marked in diagram 46 by a dashed line running parallel to abscissa 48.

A temperature curve 52 indicates the progression of the temperature in the reactor chamber 12. In the upper area of the reactor chamber, the temperature is above the melting point and drops continuously towards the bottom until it reaches the melting temperature at a point indicated with $X_k$. This point is identified with a cross 54 in diagram 46.

A dashed line 56 indicates that the boundary between the starting material 42 and the solid section 44 of the fiber blank lies at this level in tube 22. By gradually guiding the tube 22 downward more starting material is continuously cooled below the melting point and crystallized.

FIG. 2a shows a perspective principle diagram of a device to produce a fiber blank. FIG. 2b shows a cross-sectional view of the same device. The device contains a vessel 60, which has approximately the shape of a hollow cylinder cut through in a center plane. The vessel 60 accommodates a starting material bath 62, which is composed for example of a liquid AgCl/AgBr mixture. A solid, cylindrical core 64 is partially submerged in the starting material bath 62. The core 64 is positioned in a storage device 66 (only indicated here in principle) so that it can be rotated around its longitudinal axis 68. The storage device 66 is designed in such a way that the core can be shifted upwards or downwards relative to the bath.

When rotating the section of the core 64 submerged in the starting material bath 62, liquid starting material adheres to it surface. After this section emerges from the bath 62, the adhering liquid starting material cools and crystallizes. When it is re-submerged in the bath, this material forms the surface for the adhering of additional liquid starting material. The cylindrical core 64 grows bit by bit in the radial direction in this way.

Figure 2D:
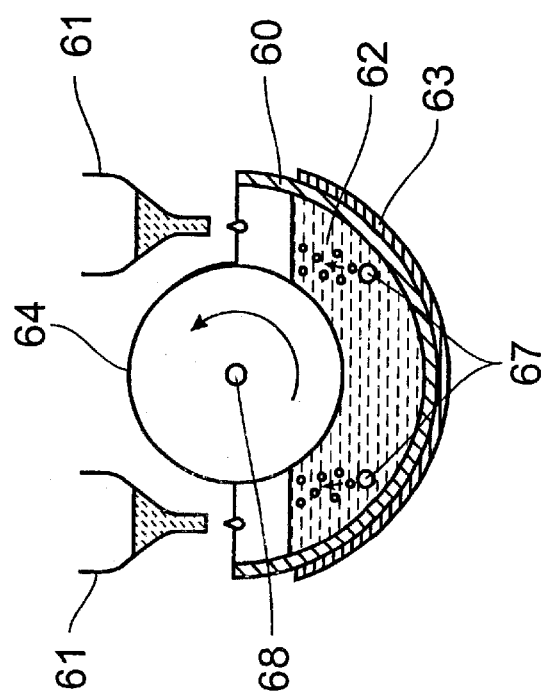
FIG. 2d is a sectional view of another device to produce a fiber blank.
Figure 2C:
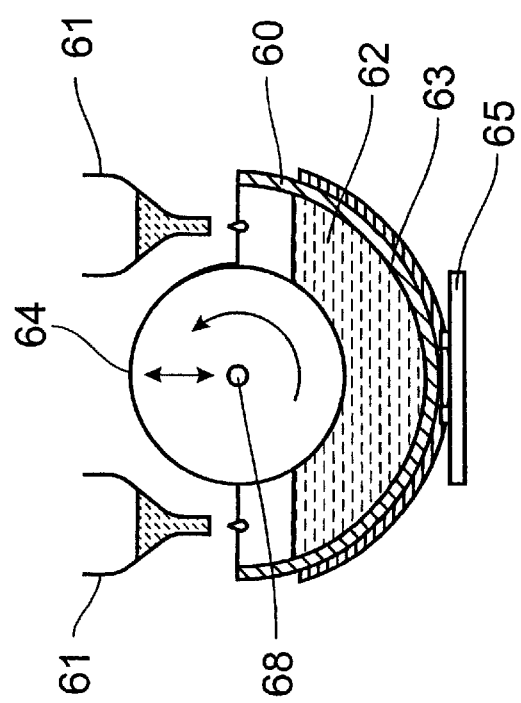
FIG. 2c is a sectional view of another device to produce a fiber blank.

FIG. 2c shows another device to produce a fiber blank. To a large extent, the device is identical to the device shown in FIGS. 2a and 2b. In addition, the device in FIG. 2c includes a heating device 63 to set the temperature of the bath 62. The heating device sheaths the vessel 60 to a large extent so that the temperature of the liquid can be set precisely. Further, the device in FIG. 2c is planned to create a fiber blank whose index of refraction changes radially continuously. To do this, the composition of the starting material is modified in the course of the core's 64 growth. Funnels 61 containing a starting material with another mixing ratio of AgBr and AgCl than in the bath are provided for this purpose. The liquid from the funnels is mixed with the bath 62 in the course of the growth of the fiber blank. The index of refraction of the fiber blank is supposed to be unchangeable in the direction of its longitudinal axis. As a result, one must always make sure that the liquid starting material in the bath is a homogenous mixture. Attached to the underside of the vessel is a vibration device, which shakes the container 60 in such a way that the liquid originating from the funnels 61 is distributed homogenously in the bath 62. The frequency and amplitude of the vibration must be adjusted suitably for optimal blending of the liquid. The vibration device includes several piezoelectric crystals that are attached along the container and are triggered simultaneously by an alternating voltage source.

FIG. 2d shows a sectional view of another device to produce a fiber blank. To a large extent, this device corresponds to the one shown in FIG. 2c. Instead of a vibration device, the device includes tubular gas lines 67 to transmit inert gases through the liquid. The gas lines 67 are located on the floor of bath 62 and extend over the entire length of the bath 62. Located on the upper side of the gas lines 67 are openings (not shown) from which the gas exits and rises vesicularly to the surface of the liquid. Nitrogen or a noble gas is commonly used as the inert gas. The gas bubbles flowing through the liquid provide for blending of the liquid. The gas lines 67 are arranged in such a way that the gas bubbles rise between the core 64 and the liquid mixed in via the funnel in order to guarantee optimal blending.

Figure 3:
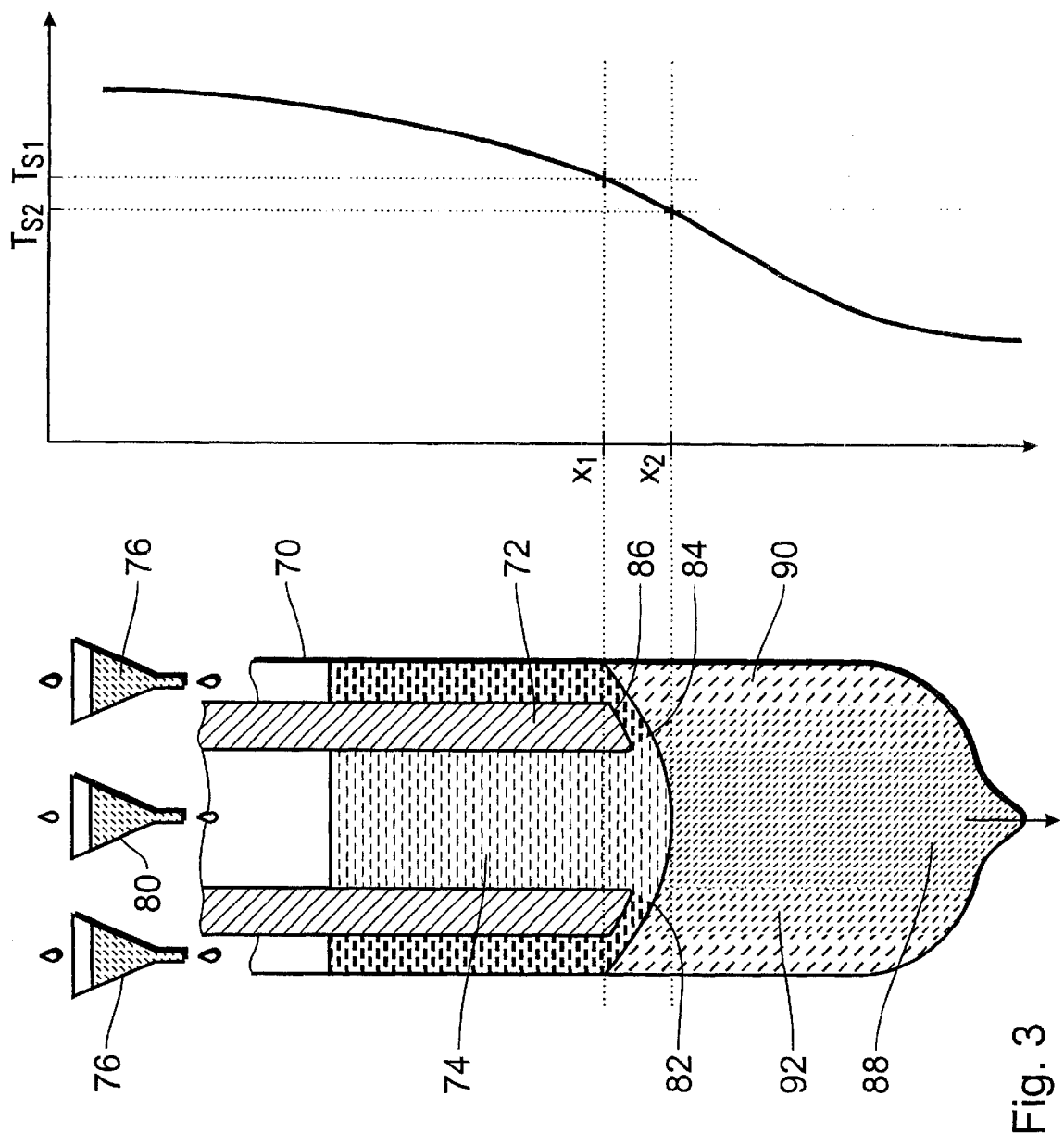
FIG. 3 is a schematic, very simplified sectional view of another device to produce a fiber blank.

FIG. 3 shows a section of another device to produce a fiber blank. The device is fundamentally similar to the device 10 described on the basis of FIG. 1. The reactor chamber is not described in further detail in this case. The present device has a first tube 70 within the reactor chamber. A second tube 72 with a smaller diameter projects into the first tube 70. The first tube 70 can be displaced in the direction of its longitudinal axis against the second tube 72.

In the case of the present device, producing a fiber blank takes place basically as described on the basis of FIG. 1, namely by cooling a starting material 74. For this purpose the tube 72 is shifted continuously downwards along a temperature profile 75.

In contrast to the device in accordance with FIG. 1, the starting material 74 in this case is composed of different components, however. While a first liquid starting material is fed through the external, first tube 70, a second starting material is fed through the internal, second tube 72. In the case of the first starting material, one is dealing with the starting material for the cladding of an optical fiber, in the case of the second starting material with the starting material for the core of the optical fiber. The material for the core [is] AgCl/AgBr with a ratio of 3 to 1 for example.

Consequently, the first and second tubes with different feeds systems for liquid starting material are connected, which is indicated in FIG. 3 by three different purification stages 76 and 80. The purification stages 76 discharge into the first tube 70 and the purification stage 80 discharged into the second tube 72.

The different starting materials come into contact with one another in the area of the discharge opening of the second tube 72 into the first tube 70. A cylindrical diffusion zone 84 forms between the second tube 72 and a crystallization surface 82 under the wall of the second tube 72. A blending of the different starting materials based on flows can be prevented by correspondingly slow process control. In the case of silver halides, these types of flow problems basically do not play an essential role, however.

The front surface 86 of the second tube 72 is formed parallel to the phase boundary surface. In this way, it is guaranteed that the duration of the diffusion is independent of the radial position.

The shape of the crystallization surface 82 depends upon the melting temperatures of the starting materials used and the temperature profile 75. In the present case, the first starting material fed through the first tube 70 has a higher melting temperature $T_{S1}$, than the second starting material fed through the second tube 72, which has a melting temperature of $T_{S2}$.

The temperatures $T_{S1}$ and $T_{S2}$ are reached in the reactor chamber at different positions $x_1$ and $x_2$. As a result, the crystallization surface extends in the longitudinal direction of the first tube 70 between these positions $x_1$ and $X_2$. In the radial direction of the tube 70, the position of the boundary surface between the liquid and the solid phase is dependent upon the mixing ratio between the two starting materials. The larger the portion of the first starting material, the closer the phase boundary surface lies to position $x_1$. The larger the portion of the second starting material, the closer the phase boundary surface lies to position $x_2$. In the present case, a convexly curved phase boundary surface 82 forms between the two starting materials as a result of the diffusion.

With given starting materials and a given temperature profile in the reactor chamber, the precise shape of the phase boundary surface 82 can be calculated on the basis of the melting temperature of the pure starting material and its mixtures.

The solid fiber blank with a core 88 composed of the crystallized second starting material forms beneath the phase boundary surface. Externally the blank has a cladding made of the first starting material. A transition area 92 is located between the core 88 and the cladding 90.

FIG. 4a shows the device to produce a fiber blank in accordance with FIG. 3. Next to it, FIG. 4b shows a diagram that shows the dependence of the corresponding index of refraction on the radial position in the case of three different cylindrical fiber blanks. A different line type is assigned to the index of refraction of each fiber blank. A solid solution of AgBr/AgCl with different mixing ratios in the core and cladding is always shown as an example. The pure cladding material has an index of refraction of 2.1 and the pure core material has an index of refraction of 2.2. Only the diffusion duration before conversion of the starting material bath into the solid phase was varied.

The solid line 94 is an index of refraction profile with a relatively sharp, almost step-shaped transition almost without a transition area. It corresponds to a short diffusion duration. The dashed line 96 shows, on the other hand, a slightly rounded index of refraction profile corresponding to an average diffusion duration. A transition area with indices of refraction that gradually drop from 2.2 to 2.1. is located between the core and cladding. Finally, the dashed and dotted line 98 shows a very rounded index of refraction profile with a transition area of great expansion. This is the result of an especially long diffusion duration before crystallization.

FIG. 5b shows a diagram with the dependence of the index of refraction on the radial position with another cylindrical fiber blank. Next to it, FIG. 5a shows another device to produce a fiber blank. This device represents a modified embodiment of the device in accordance with FIG. 3. In this device, the second tube 72 runs within a third tube 73. The first tube 70 in turn surrounds the third tube. The starting material fed through the second tube 72 corresponds to the starting material fed through the first tube and has an index of refraction of 2.2 in a solid phase, for example. Now a starting material that has an index of refraction of 2.1 in a solid phase, for example, is fed through the third tube 73. A fiber blank with a W-shaped index of refraction profile 100, which is shown in the diagram in FIG. 5b, is generated as a result of the diffusion. In addition, an annular piezoelectric element arrangement 75 and 77, which is triggered by means of an alternating voltage generator (not shown), is attached to the tube 72 and 73. The tubes 72 and 73 are thus set into a vibration along their longitudinal axis that is predetermined by the alternating voltage generator. This causes a greater blending of the starting materials in the diffusion zones beneath the tubes 72 and 73. Therefore, the progression of the index of refraction can be set. Greater blending causes a less steep progression of the index of refraction in the area of the diffusion zone. A lesser blending has the opposite effect.

These types of W-shaped gradient index of refraction profiles have the advantage that the core-cladding structure of a fiber is generated at the same time as the crystal pulling process and not during the subsequent extrusion process. Especially low concentrations of impurities are achieved in this way, which in the conventional production process concentrate just at the boundary surface of the core and cladding.

Figure 6A:
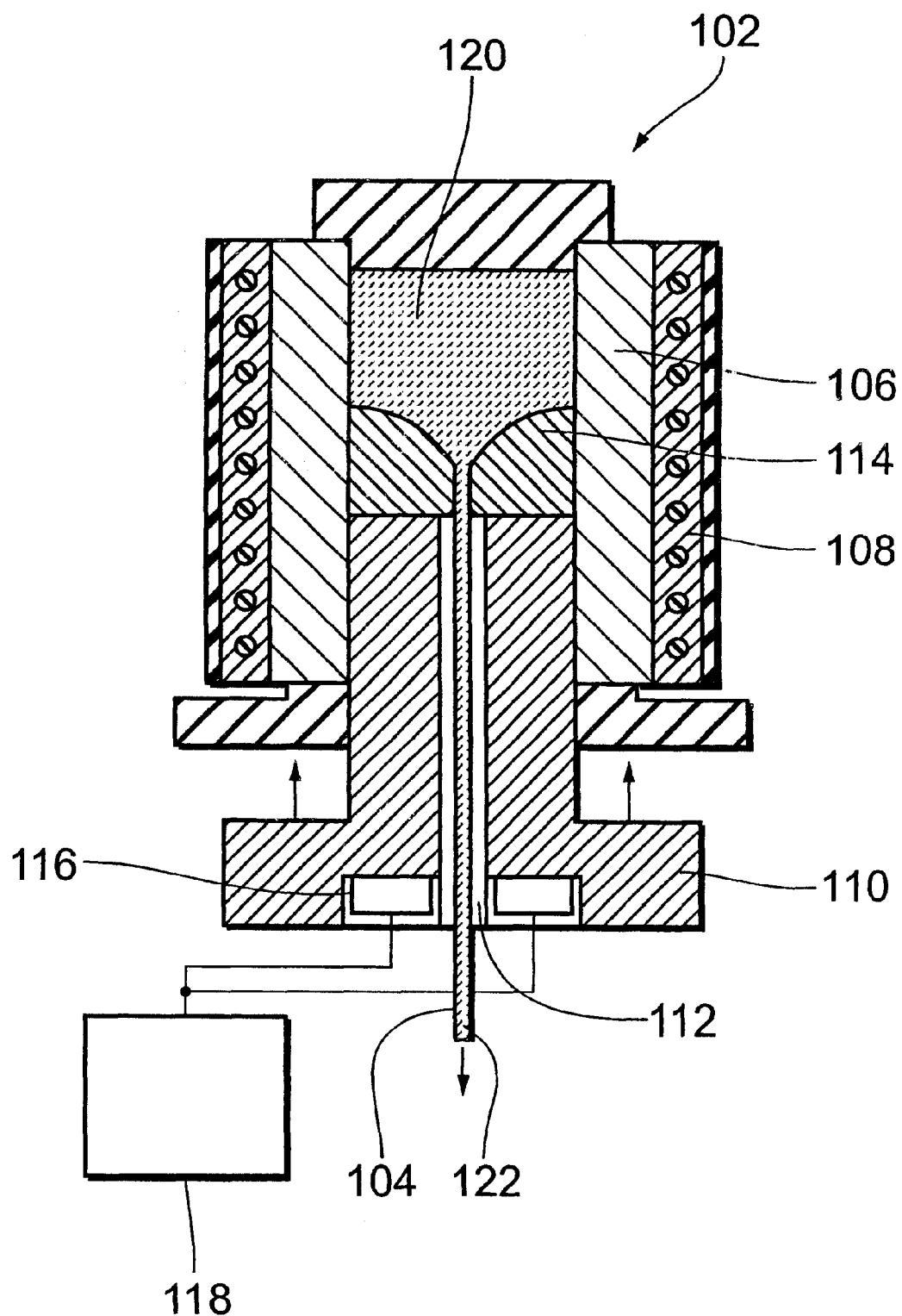
FIG. 6a is a simplified representation of an extrusion device to produce an optical fiber.

FIG. 6a shows a simplified representation of an extrusion device 102 to produce an optical fiber 104. The extrusion device 102 has an approximately cylindrical high-pressure chamber, which is enclosed by heat-conducting walls 106. A heating device 108 surrounds the walls.

A longitudinally displaceable ram 110 engages in the high-pressure chamber. The ram 110 has a centric bore hole 112 extending over the entire length. The ram 110 is in contact at its longitudinal end with a nozzle 14 in the high-pressure chamber. On the opposite longitudinal end, the ram 110 is provided with a vibration device 116 having piezoelectric element, which is connected to a power supply and frequency generator unit 118.

The nozzle 114 has a nozzle opening that is concentric with the bore hole 112. Its side facing the reactor chamber has a surface curved towards the nozzle opening. This surface is in contact with a fiber blank 120.

To produce an optical fiber, the ram exerts a force of pressure on the fiber blank 120 via the nozzle. At the same time the vibration device generates a vibrational force superimposed on the force of pressure of the ram 110, which is transmitted via the ram and nozzle 114 to the fiber blank 120. As a result, a periodic increase and decrease in pressure is superimposed on the extrusion pressure exerted by the nozzle 114 on the fiber blank 120. The crystallites of the fiber blank that are in contact with the nozzle 114 are thereby set in vibration. These interact due to the vibration with other crystallites of the fiber blank. This vibration shakes the crystallites in such a way that the gas interstices between them are minimized. This provides for an especially dense distribution of the micro-crystallites in the optical fiber 122 projecting downward in the bore hole 112 of the ram 110 of the extrusion device 102.

Figure 6B:
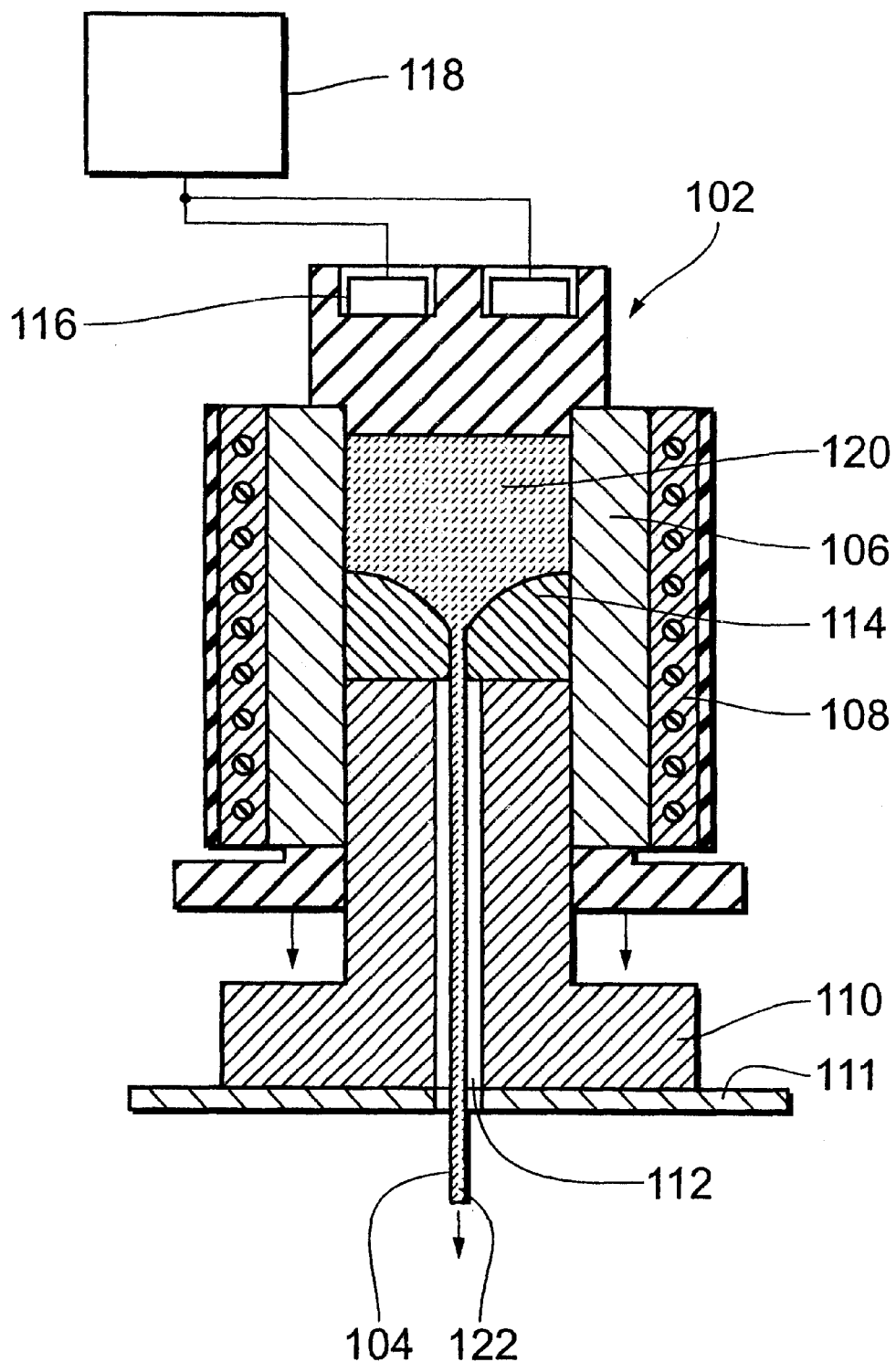
FIG. 6b is a simplified representation of another extrusion device to produce an optical fiber.

FIG. 6b shows a simplified representation of an extrusion device 102, which differs from the extrusion device shown in FIG. 6a in the following details. The ram 110 of the extrusion device is designed to rest on a base 111. The base 111 has an opening through which the optical fiber 104 is extruded. The high-pressure chamber 120 is pressed on the ram 110 in order to extrude the fiber 104 from the opening of the base 111. The piezoelectric elements of the vibration device 116, which are connected to a power supply and frequency generator unit 118, are provided in area of the wall 106 that is opposite from the ram 110. This arrangement of the vibration device has the advantage that the piezoelectric element does not have to bear the weight load of the chamber 120 and the wall 106 bordering it and the heating device 108.

Figure 7A:
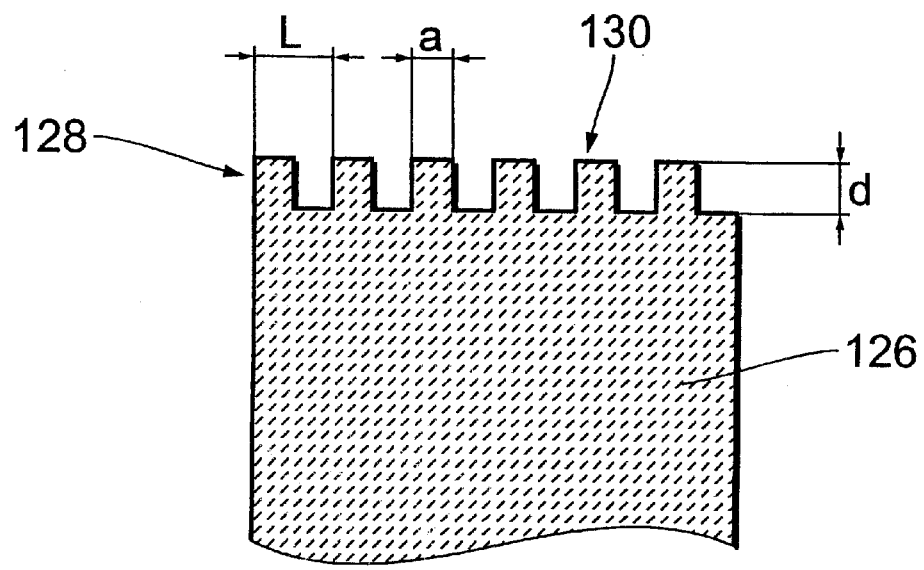
FIG. 7a is a profile of the end of a fiber of an embodiment of an optical fiber in accordance with the invention.
Figure 7B:
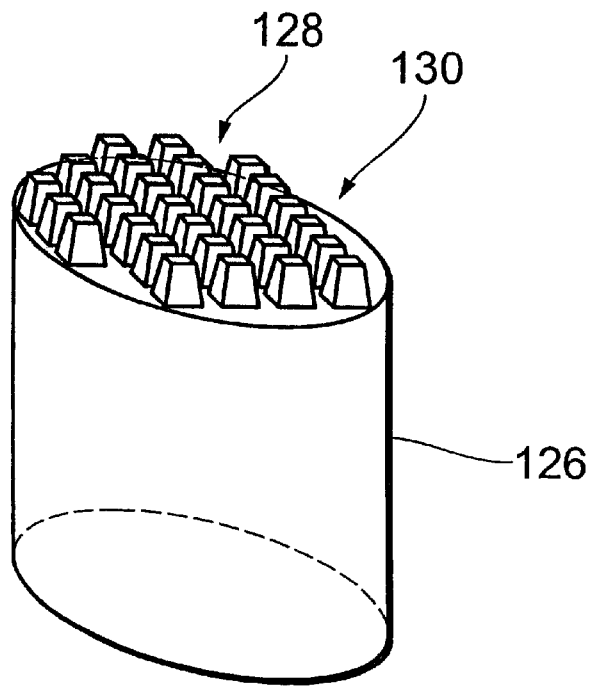

FIG. 7a shows a profile of an optical fiber 126 fabricated of metal halides in the area of a longitudinal end. FIG. 7b shows a perspective view of the same area. The sectional plane of the representation in FIG. 7a runs in a center plane containing the longitudinal axis of the cylindrical fiber 126.

The fiber 126 has a reflection-reducing microstructure 130 on a front surface 128. The microstructure is composed here of approximately cuboid elements arranged periodically in two directions that are mutually perpendicular, an x-direction and a y-direction. The periods, that is the distance between the same sections of neighboring elements is designated with L in FIG. 7a and is identical here in the x-direction and the y-direction. The period L is a function of the wavelength range in which the fibers are supposed to operate. The period is approximately 2 micrometers for wavelengths between approx. 8 and 12 micrometers. The representations in FIGS. 7a and 7b do not reproduce these dimensions to scale.

The side length of the cuboids is designated with a. By stipulating the relationship L/a, the so-called filling factor, the effective index of refraction of the microstructure can be set to a value between that the of fiber and that of the surrounding medium, air for example. To produce a Lambda/4 layer, the effective index of refraction is selected as the geometric mean of the two indices of refraction for fiber and air. Utilizing diffraction effects, a reflection-reducing surface of the fiber is thereby generated.

Figure 8A:
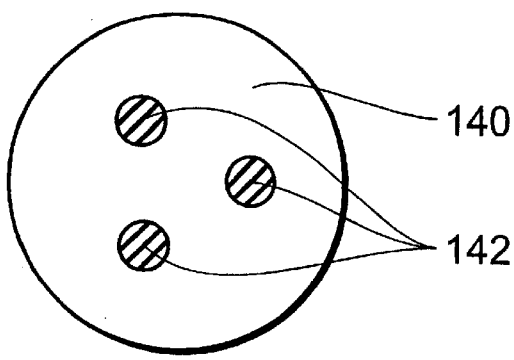
FIG. 8a is a cross-section of a fiber with several cores.

FIG. 8a shows a cross-section of a fiber with several channels or cores 142. The channels 142 are formed cylindrically and pass through the optical fiber along its entire longitudinal extension. Three channels 142 are shown in FIG. 8a, which are separated from one another. The cladding 140 is located between the channels 142. The cladding is composed of a material having another index of refraction than the index of refraction in the cores. Due to the difference between the indices of refraction, there is a full reflection of light at the boundary surface between the fiber-optic light guides and the cladding. The light radiation located in the channels cannot leave them and is guided through the fiber. Since the channels are separated from one another by the cladding 140, the light directed through a channel cannot get into one of the adjacent channels.

Figure 8B:
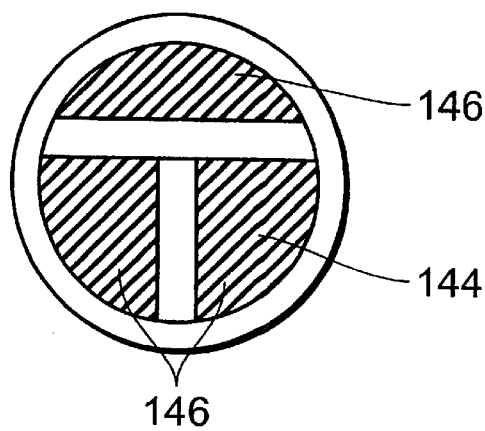
FIG. 8b is a cross-section of another fiber with several cores.
Figure 8C:
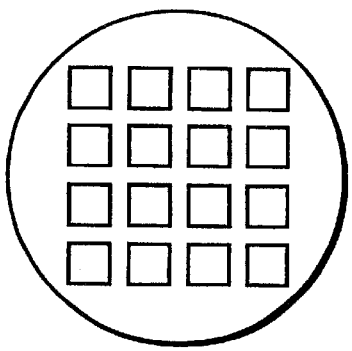
FIG. 8c is an optical fiber with light channels of a square diameter arranged in accordance with a square matrix.
Figure 8D:
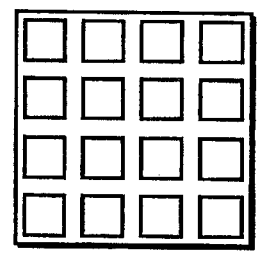
FIG. 8d is an optical fiber with a square external cross-section.
Figure 9:
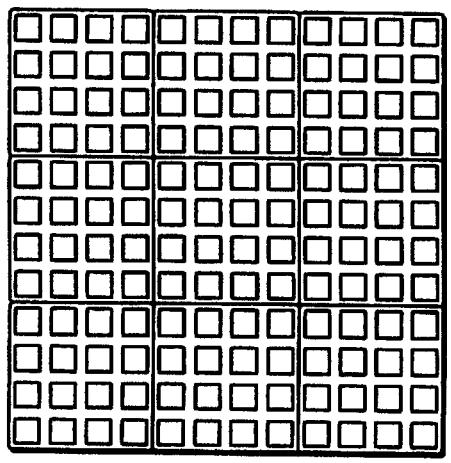
FIG. 9 is a fiber bundle made of several fibers in accordance with FIG. 8d.

FIG. 8b shows a cross-section of another optical fiber with several channels or cores 146. In contrast to the fibers in FIG. 8a, the cores do not have a circular cross-section profile, rather they form segments of a circle of various sizes. The channels are formed by a cladding 144 forming a border that is essentially circular in cross-section, which is infiltrated by a T-shaped section of the cladding 144.

Figure 10:
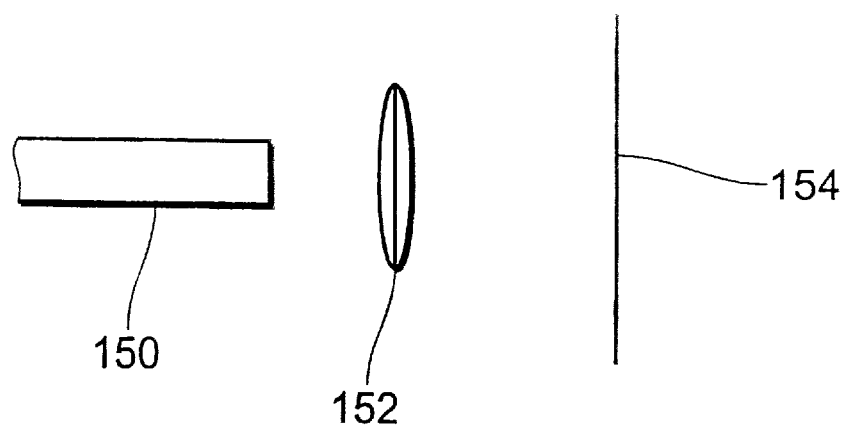
FIG. 10 is a schematic view of a device to project a fiber end on a projection plane.

FIG. 10 shows a schematic side view of a device to project the end of a fiber on a projection plane 154. An optical system 152 that makes sure that the end of the fiber is depicted in focus on the projection plane 154 is arranged between the end of the fiber 150 and the projection plane 154. The optical system 152 is made up of one or more lenses whose focal depth and distances from one another and to the end of the fiber 150 and the projection plane 154 are selected in such a way that an in-focus and enlarged image appears on the projection plane 154.

Figure 11:
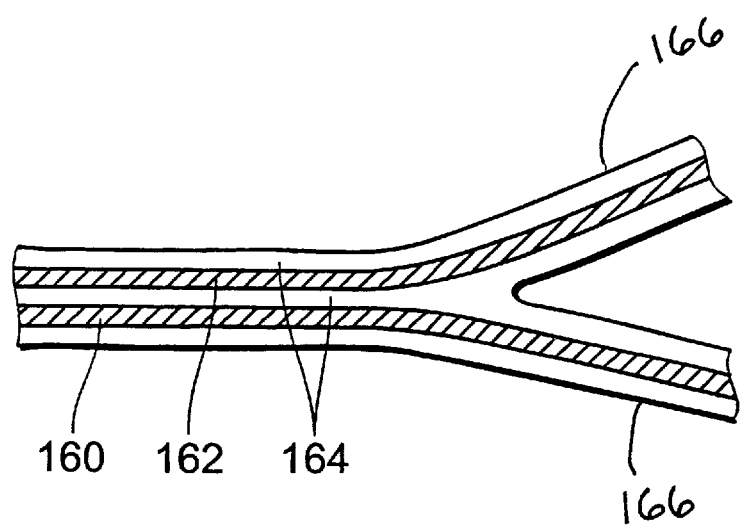
FIG. 11 is a side view of a bifurcated fiber.
Figure 12:
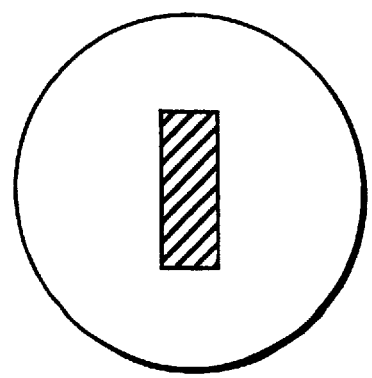
FIG. 12 is an optical fiber with a light channel with a rectangular cross-section.

FIG. 11 shows a side sectional view of a bifurcated fiber. The bifurcated fiber includes two cores 160, 162 that are surrounded by a cladding 164, which serves to separate them. Initially, the cores 160, 162 run parallel to one another through the fiber up to the bifurcation. There they run separate from one another each through one of the two fiber strands or branches 166 that continue on from the bifurcation.

Numerous variations of the devices and process presented are possible within the framework of the respective inventive idea. The fibers produced are usually formed from polycrystalline infrared fibers. For example, the chemical reaction between halogen gases and liquid metal to form metal halides can also be brought about in a reactive gas atmosphere. In the case of the extrusion device, the vibrational force can also be exerted directly on the nozzle or directly on the fiber blank. The optical microstructure on the end of the fiber can also be designed to focus the exiting or entering light, or to refract, or to deflect, or for an increased reflection.

Produced infrared fibers are subsequently introduced into a polymer tube with high rigidity, high temperature resistance, low penetrability for oxygen, moisture and other environmental substances and hermetically sealed. The polymer material can be a poly-ether-ether-ketone (PEEK) or a fluorinated polymer such as TEFLON.

What is claimed is:

1. A process for manufacturing an optical fiber, comprising the steps of:
    providing a bath of a molten starting material;
    rotating a solid core that is partially immersed in the bath to deposit and crystallize a thin layer of the starting material on a circumferential surface of the core, so that the solid core increases radially in size during the rotation thereby forming a blank; and converting the blank into an optical fiber.

2. The process of claim 1, further comprising the step of:
    exchanging the molten starting material in the bath while the core is being rotated.

3. The process of claim 2, wherein the exchanging step occurs continuously while the core is being rotated.

4. The process of claim 3, wherein the core is rotated about an axis that runs parallel to a surface of the molten starting material.

5. The process of claim 4, wherein a distance between the rotational axis and the surface of the molten starting material continuously increases.

6. The process of claim 5, wherein a submersion depth of the circumferential surface of the core in the bath is kept constant.

7. The process of claim 1, wherein the core is rotated about an axis that runs parallel to a surface of the molten starting material.

8. The process of claim 7, wherein a distance between the rotational axis and the surface of the molten starting material continuously increases.

9. The process of claim 8, wherein a submersion depth of the circumferential surface of the core in the bath is kept constant.

* * * * *